United States Patent [19]
Pillekamp

[11] Patent Number: 5,953,694
[45] Date of Patent: Sep. 14, 1999

[54] METHOD FOR TRANSMITTING ITEMS OF SPEECH INFORMATION

[75] Inventor: Klaus-Dieter Pillekamp, Erkrath, Germany

[73] Assignee: Siemens Aktiengesellschaft, Munich, Germany

[21] Appl. No.: 08/875,120
[22] PCT Filed: Jan. 3, 1996
[86] PCT No.: PCT/DE96/00005
    § 371 Date: Jul. 17, 1997
    § 102(e) Date: Jul. 17, 1997
[87] PCT Pub. No.: WO96/22640
    PCT Pub. Date: Jul. 25, 1996

[30] Foreign Application Priority Data

Jan. 19, 1995 [DE] Germany ............... 195 01 517

[51] Int. Cl.$^6$ ............... G10L 3/00; H04J 3/17
[52] U.S. Cl. ............... 704/201; 704/226
[58] Field of Search ............... 704/214, 221, 704/222, 200, 201, 223, 229, 207, 219, 226, 227, 228, 270; 370/310, 332, 342, 464, 468

[56] References Cited

U.S. PATENT DOCUMENTS

| | | | |
|---|---|---|---|
| 4,627,049 | 12/1986 | Black ............... | 370/81 |
| 4,802,171 | 1/1989 | Rasky ............... | 371/43 |
| 5,065,395 | 11/1991 | Shenoi et al. ............... | 370/81 |
| 5,299,198 | 3/1994 | Kay et al. ............... | 370/95.3 |
| 5,357,513 | 10/1994 | Kay et al. ............... | 370/95.3 |
| 5,475,689 | 12/1995 | Kay et al. ............... | 370/95.3 |
| 5,544,156 | 8/1996 | Teder et al. ............... | 370/18 |
| 5,553,190 | 9/1996 | Ohya et al. ............... | 704/221 |
| 5,563,895 | 10/1996 | Malkamaki et al. ............... | 371/32 |
| 5,631,901 | 5/1997 | Nishida ............... | 370/384 |
| 5,742,930 | 4/1998 | Howit ............... | 704/502 |

FOREIGN PATENT DOCUMENTS 42 36 088 A1  4/1994  Germany ............... H04B 7/36

OTHER PUBLICATIONS

New Orleans Supercomm/ICC '94, Serving Humanity Through Communications, 1994 IEEE International Conference on Communications, XP 000438980, Wu Gang et al, A PRMA Integrated Voice and Data System with Data Steal into Voice (DSV) Technique, pp. 580–586, May 1994.

Endgeräte–Chips, vol. 43, No. 6, Wilfried Blaesner, Audio–prozessor Vereinfacht NF–Signalaufbereitung im Mobilfunk, pp. 446–451, Jun. 1990.

*Primary Examiner*—Richemond Dorvil
*Attorney, Agent, or Firm*—Hill & Simpson

[57] ABSTRACT

Method for transmitting speech information (si) between a transmission apparatus (S) and a reception apparatus (E) via at least one radio channel (F), in which the transmission quality is increased by determining, in the transmission apparatus (S), speech pauses (sp) within the speech information, producing an item of control information (st) that represents the time position of the speech pauses (sp) within the speech information (si), and sending these suitably with respect to time via the radio channel (F)in addition to the speech information (si), and by evaluating the control information (st) in the terminal apparatus (E) in such a way that the speech pauses (sp) are correctly inserted with respect to time into the speech information (si). The method is particularly suited for the digital transmission of items of speech information (si) in wireless communication systems according to the DECT standard.

8 Claims, 2 Drawing Sheets

METHOD FOR TRANSMITTING ITEMS OF SPEECH INFORMATION

BACKGROUND OF THE INVENTION

The invention concerns a method for transmitting speech information, as well as a transmission apparatus and a reception apparatus.

In mobile communication connections for speech transmission, at least one of the parties to the call can be reached only via a radio channel. The speech information is standardly transmitted including the pauses in the conversation that it contains. The transmission of the speech information is exposed to various types of disturbing influences in the radio channel, so that disturbances occur at the receiver side that reduce the transmission quality.

In, for example, digital radio transmissions according to the DECT standard, these disturbances reach bit error rates of $10^{-3}$ to $10^{-2}$ in the maximum range region. These bit errors are distributed uniformly over the actual speaking time and the speech pauses. For the receiving party, the disturbances of the radio transmission manifest themselves as unpleasant interference noise. Standard error correction methods, such as repeated transmission of the disturbed speech segments, are not possible due to the real-time conditions.

In connection with DECT wireless telephones, a method for speech transmission is known from Siemens Components 31, 6 (1993). The transmission in the radio channel ensues with digital signals, whereby the transmission of the speech information also contains speech pauses. At the transmitting apparatus, an A/D conversion of the speech information and a forming of the transmission signals takes place, and an evaluation of the received transmission signals and a D/A conversion takes place at the receiving apparatus. In addition to the speech information, items of control information are also transmitted. The method is correspondingly also transferrable to mobile radiotelephone transmission systems, and is known there. A generalization to analog transmission methods of the speech information is also possible; the A/D conversion and D/A conversion are thereby omitted.

The inventive method makes use of the fact that during a transmission of a two-party call the actual speaking time of an individual party is on average much less than 50% of the duration of the call; thus, the pauses in speech contained in the speech information take up a large part of the transmitted speech information. A correspondingly large portion of the bit errors fall to these pauses in speech.

From the German laid open print DE 42 36 088 A1, it is known to improve speech transmission for wireless telephones according to the DECT standard by temporarily suppressing speech transmission when determined error boundary values are exceeded. However, it is necessary to determine the errors that have occurred, which is possible only at the receiver.

Furthermore, from Blaesner, W.; "Audioprozessor vereinfacht NF-Signalaufbereitung im Mobilfunk," ntz vol. 43, 1990, no. 6, pp. 446–451, an audio processor is known that determines speech pauses at the transmitter and produces a logic signal for switching off the transmission final stage. The transmission energy expended and the background noise can thereby be reduced. However, the disturbances occurring in the transmission channel cannot be corrected during the speech pauses.

SUMMARY OF THE INVENTION

The underlying aim of the invention is to develop the known method for transmitting speech information such that the quality of the speech transmission is improved, and to indicate associated transmission and reception apparatuses. The solution of the aim ensues based on the method according to the preamble of patent claim 1, by means of the characterizing features thereof. Further inventive transmission and reception apparatuses are indicated in independent claims.

In the scope of the inventive method for transmitting speech information, the speech information to be transmitted is analyzed in the transmitting apparatus for the speech pauses it contains. The speech pauses are recognized and items of control information are respectively produced that represent the time position of the speech pauses within the speech information. In addition to the speech information, the control information is sent suitably with respect to time via the radio channel by the radio part so that in the reception apparatus the speech pauses represented in the control information can be inserted into the speech information at the correct time position by the arithmetic logic unit of the receiver apparatus after the evaluation.

If the inserted signals realizing the speech pauses exhibit no disturbances, the inventive method reduces the transmission errors by a percentage amount that corresponds approximately to the portion of the speech information consisting of speech pauses. For the receiving party, the disturbing noises fall during the speech pauses of the transmitting party, whereby a more pleasing hearing sensation is achieved. The quality of the speech transmission is detectably increased.

An advantageous development of the inventive method introduces a comparison of the length of the speech pauses with the length of a frame of a frame clock during the determination of the speech pauses. The control information is produced only when the speech pause is longer than the frame length. It is thereby ensured that the control information is produced only given a minimum duration of the speech pauses. The control information can thereby be connected with the character generation of the frame clock.

Corresponding to an advantageous development of the invention, the insertion of the speech pauses ensues by interrupting the current supply of the D/A converter for the time duration of the speech pauses. The additional advantage of an energy saving thereby results. In addition to the interruption of the current supply of the D/A converter, a noise signal generated in a signal generator can be supplied to the electroacoustic converter in place of the analog speech information produced in the D/A converter. The speech pauses can thereby be organized in a way that is pleasant for customary human hearing.

The inventive method can be used not only for digital transmission methods, but is also suited for analog transmission of the speech information in the radio channel.

The method can be constructed in such a way that it is compatible with the previous method for transmitting speech information. The control information (coding and manner of transmission) is adapted to the transmission method of the speech information in such a way that during a communication of a transmission apparatus without means for producing the control information, or of a reception apparatus without means for evaluation of the control information, the speech information, including the speech pauses contained therein, are supplied to the electric-acoustic transducer of the reception apparatus. The transmission apparatus and the reception apparatus can thereby work together independently of whether both are provided with means for carrying out the inventive method.

BRIEF DESCRIPTION OF THE DRAWINGS

The features of the present invention shich are believed to be novel, are set forth with particularity in the appended claims. The invention, together with further objects and advantages, may best be understood by reference to the following description taken in conjunction with the accompanying drawing, and in which:

DESCRIPTION OF THE PREFERRED EMBODIMENT

Concerning the construction and the most important modules of a DECT mobile station and of a base station, reference is made to Siemens Components 31, 6(1993), p. 216. A transmission installation and receiver installation are integrated into the mobile station. An AF analog circuit (PMB 2920) contains an A/D converter and a D/A converter. A digital module (PMB 2720) contains the functions of the arithmetic logic unit and the formation or, respectively, evaluation. An RF transmitter and an RF receiver essentially form a transmitting or, respectively, receiving radio part (PMB 2220, PMB 2420).

Figure 1:
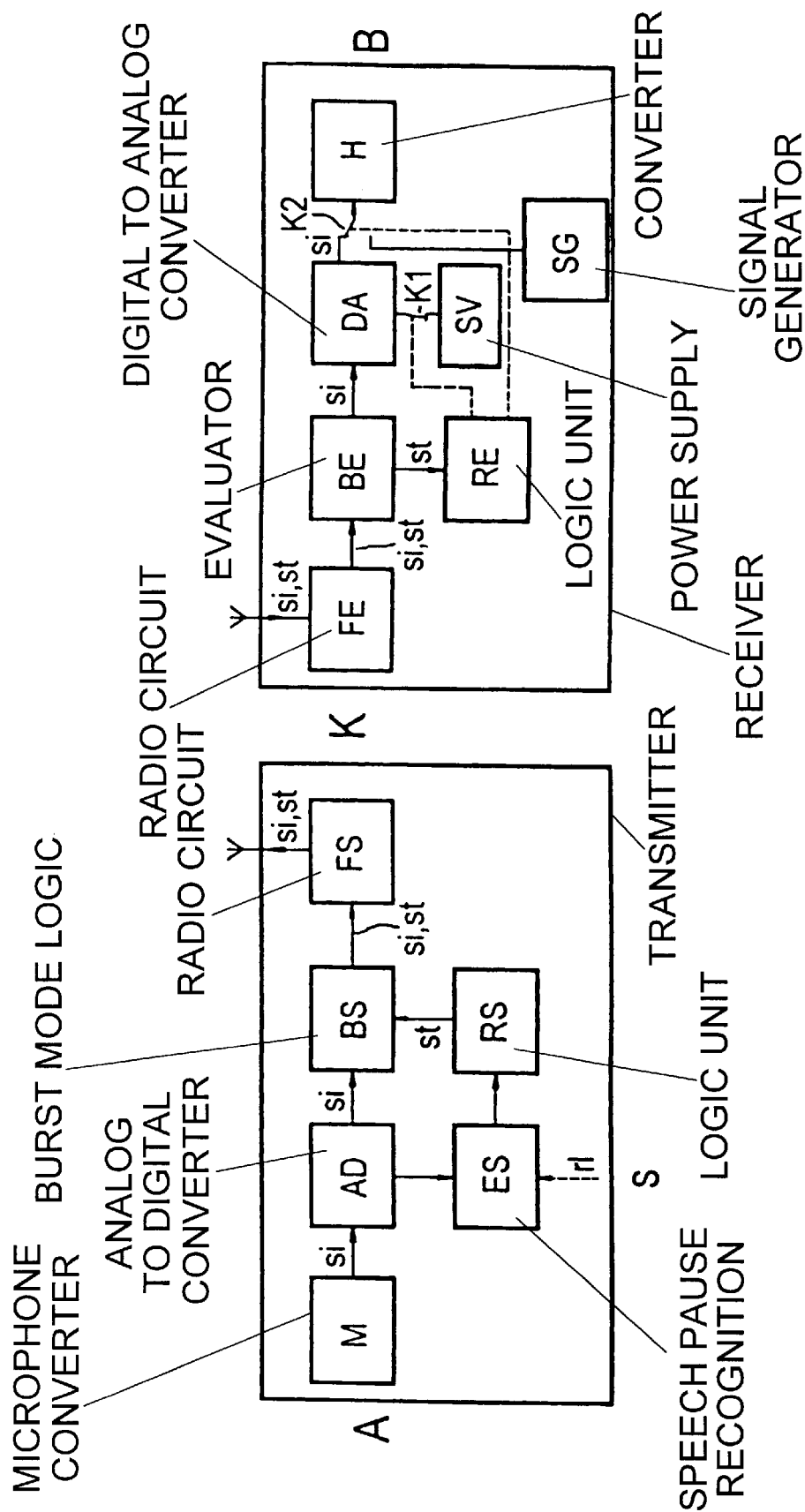
FIG. 1 shows a transmission apparatus and a reception apparatus for carrying out the method for transmitting the speech information.

The transmission apparatus S shown in FIG. 1 is connected with a reception apparatus E via at least one radio channel F, in a one-sided communication connection. A speech transmission from party A to party B is thereby given. For a bidirectional transmission, each of the parties must be provided with a transmission apparatus and a reception apparatus. In addition, radio channels F must be provided for both directions.

An acoustic-electric converter M in the transmission apparatus S, e.g. a microphone, receives the speech information si of the party A in the form of acoustic oscillations, and converts it into an analog electrical item of speech information si. An A/D converter AD, in which the analog electrical speech information si is converted into digitized form, is connected to the microphone M. The digital speech information is supplied to a means for forming the transmission signals BS (burst mode logic element) and to a means for speech pause recognition ES. In addition, a signal containing the length of the frame clock r1 is processed in the means ES for speech pause recognition ES. The speech pause recognition means ES then produces an item of control information st that represents the time position of the speech pauses sp within the speech information si, if the speech pause sp completely fills at least one frame length r1. The control information st is supplied to the arithmetic logic unit RS by the speech pause recognition means ES. Transmission signals containing the speech information si and the control information st are formed in the means for forming the transmission signals BS, which is connected with the A/D converter AD and with the arithmetic logic unit RS. The field designated in the DECT standard as the A field for control information of a frame clock receives the control information st prepared in the arithmetic logic unit RS. The control information st is written to bit positions that are not used by the method according to the DECT standard. A single bit position in the A field of each transmitted frame determines whether the frame is completely filled by a speech pause sp (e.g. the bit is logical "1"), or whether the frame at least partly contains spoken information (bit is logical "0"). The means for forming the transmission signals BS supplies the speech information si and the control information st to a radio part FS, which sends the items of information via a radio channel F.

The reception apparatus E receives the speech information si and the control information st from the radio channel F via a radio part FE. A means for evaluating the received transmission signals BE is connected with the radio part FE. An arithmetic logic unit RE takes over the control information st from this means for evaluating the received control signals BE, and a D/A converter DA takes over the speech information si from this means.

The power supply SV of the D/A converter DA can be switched off via the contact K1. The D/A converter DA converts the received digitized speech information si into analog items of speech information si, and supplies it to an electric-acoustic converter H, e.g. a playback head, via a converter K2. The party B receives the speech information si from the electric-acoustic transducer H via acoustic oscillations. The converter K2, controlled by the arithmetic logic unit RE, selectively connects the electric-acoustic transducer H with the D/A converter DA or with a signal generator SG. The signal generator SG produces a noise signal. This noise signal has a timbre that is pleasing for the receiving party B and that represents the speech pauses.

The arithmetic logic unit RE evaluates the control information st and places the speech pauses sp into the speech information si correctly with respect to time. For this purpose, the opening of the contact K1, and, at the same time, the switching over of the changeover switch K2 from the connection with the D/A converter DA to the signal generator SG, is caused by the arithmetic logic unit RE. The D/A converter DA is thereby in the off position, and the noise signal for a number of frame clocks representing the duration of the speech pauses sp is supplied to the electric-acoustic transducer H. At the end of the speech pauses sp, the contact K1 is again closed, and the changeover switch K2 connects the D/A converter DA again with the electric-acoustic transducer H; the speech information si, containing no speech pauses sp, is thus again transmitted.

Figure 2:
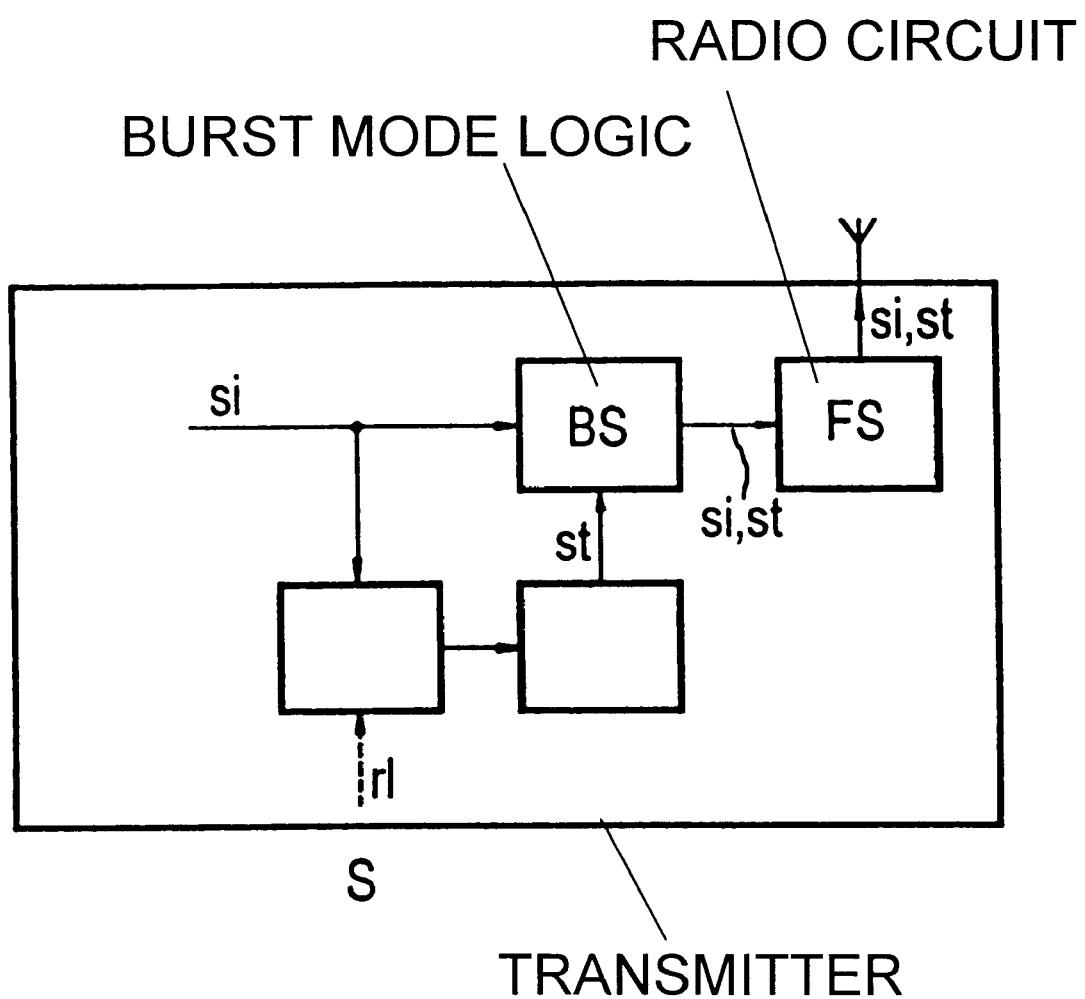
FIG. 2 shows a further embodiment of the transmission apparatus for carrying out the method for transmitting the speech information.

FIG. 2 shows a further exemplary embodiment of the transmission apparatus S. The design differs in principle from the transmission apparatus S shown in FIG. 1 only in that the digitized speech information si is already supplied to the transmission apparatus S. An acoustic-electric converter M and an A/D converter AD can thus be omitted. The digitized speech information si is supplied directly to the speech pause recognition means ES and to the means for producing the transmission signals BS. This form of the transmission apparatus S is suited for base stations in mobile or wireless communication systems.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting items of speech imformation between a transmission apparatus, having an arithmetic logic unit and radio part, and a reception apparatus, having a radio part, an arithmetic logic unit and an electric-acoustic transducer, via at least one radio channel, comprising the steps of:

determining in the transmission apparatus, speech pauses within the speech information;

producing an item of control information representing a time position of the speech pauses within the speech information;

transmitting in addition to the speech information, the control information with respect to time via the radio channel by the radio part of the transmission apparatus; and evaluating the control information in the reception apparatus such that the speech pause are inserted correctly with respect to time into the speech information that is received by the radio part at the reception apparatus.

2. The method according to claim 1, wherein in the transmission apparatus, during the determination of the speech pauses, a duration thereof is compared with a frame length of a frame clock, and wherein the control information is produced only if a respective speech pause is longer than the frame length.

3. The method according to claim 1, wherein for the correct insertion with respect to time of the speech pauses into the received speech information, the arithmetic logic unit allocated to the reception apparatus interrupts a current supply of a digital to analog converter for a duration of the speech pauses.

4. The method according to claim 1, wherein for the correct insertion with respect to time of the speech pauses into the speech information, the arithmetic logic unit allocated to the reception apparatus causes a noise signal produced in a signal generator to be supplied to an electric-acoustic transducer.

5. The method according to claim 1, wherein the transmission of the speech information and of the control information ensues in digitized form via the radio channel.

6. The method according to clam 1, wherein the control information is inserted into a transmission protocol for transmission of the speech information such that during a communication of a further transmission apparatus without a device for producing the control information or of a further reception apparatus without a device for evaluation of the control information, only the speech information, including the speech pauses contained therein, is supplied to an electric-acoustic transducer of the reception apparatus.

7. A transmission apparatus for transmtting speech information, comprising:

an arithmetic logic unit operatively connected to a radio part;

speech pause recognition device for recongnizing speech pauses located in the speech information; the speech pause recognition device and the arithmetic logic unit producing time position of the speech pauses within control information representing the speech information;

device for forming transmission signals such that the control information is transmitted with respect to time by the radio part, in addition to the speech information, via the radio channel.

8. A reception apparatus for receiving speech infomation and control information, the speech information having speech pauses, and the control information having information regarding time position of the speech pauses in the speech information, compromising:

a radio part operatively connected to an arithmetic logic unit, a digital to analog converter and an electric-acoustic transducer;

a system structured such that the control information is evaluated in the arithmetic logic unit and the speech pauses are inserted correctly with respect to time into the speech information.

* * * * *